United States Patent
Lilliston, III et al.

(10) Patent No.: US 10,682,770 B1
(45) Date of Patent: Jun. 16, 2020

(54) ARTICULATING SUCTION CUP TOOL

(71) Applicant: Amazon Technologies, Inc., Seattle, WA (US)

(72) Inventors: Leonard Thomas Lilliston, III, Roxbury, MA (US); Beth A. Marcus, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/013,415

(22) Filed: Jun. 20, 2018

(51) Int. Cl.
*B25J 15/06* (2006.01)
*B25J 9/04* (2006.01)
*B65H 29/24* (2006.01)
*B65H 3/08* (2006.01)

(52) U.S. Cl.
CPC ........... *B25J 15/0616* (2013.01); *B25J 9/045* (2013.01); *B65H 3/0883* (2013.01); *B65H 29/241* (2013.01); *B65H 2555/31* (2013.01)

(58) Field of Classification Search
CPC ........ B25J 9/045; B25J 9/1055; B25J 9/1045; B25J 15/0616; B25J 15/0683; B25J 19/0075; B25J 19/063; B65H 3/0883; B65H 29/241; B65H 2555/31; B66C 1/0218; B66C 1/0262; B66C 1/0275; B66C 1/0293; Y10S 901/45; Y10S 901/49
USPC .................................... 294/183, 65; 414/737
See application file for complete search history.

(56) References Cited

U.S. PATENT DOCUMENTS

| | | | | |
|---|---|---|---|---|
| 3,613,904 A * | 10/1971 | Blatt | .................... | B65G 47/915 294/64.2 |
| 4,364,707 A * | 12/1982 | Ott | .......................... | H01L 21/67 414/590 |
| 4,600,228 A * | 7/1986 | Tarbuck | .................. | B65G 47/91 228/5.5 |
| 4,604,026 A * | 8/1986 | Barrett | ................. | B25J 15/0616 414/728 |
| 5,059,086 A * | 10/1991 | Thierion | ................ | B65G 61/00 414/626 |
| 5,172,922 A * | 12/1992 | Kowaleski | ........... | B25J 15/0616 279/3 |
| 5,580,209 A * | 12/1996 | Ogawa | .................... | B25J 9/1065 414/729 |
| 5,791,861 A * | 8/1998 | Seelig | .................... | B65G 47/91 212/276 |
| 7,959,399 B2 * | 6/2011 | Horning | ............... | B25J 15/0616 414/729 |
| 8,960,750 B2 * | 2/2015 | Gong | ................... | B25J 15/0057 294/188 |
| 9,004,846 B2 * | 4/2015 | La Rovere | ........... | B25J 15/0616 294/65 |
| 9,114,536 B2 * | 8/2015 | Sussman | ............. | B25J 19/0004 |
| 9,937,628 B2 * | 4/2018 | Werner | .................. | B25J 13/086 |

* cited by examiner

*Primary Examiner* — Dean J Kramer
(74) *Attorney, Agent, or Firm* — BakerHostetler

(57) ABSTRACT

An articulating end-of-arm tool includes back-drive capability. The tool has a cable drive including a vertically oriented capstan head, a pair of idler pulleys, a driven pulley and a tensioner. The driven pulley pivot on a hollow shaft, through which a vacuum channel passes. The vacuum channel extends through the length of the body, including past the vertically oriented motor. The driven pulley is within 10 degrees of perpendicular of the longitudinal axis of the tool.

18 Claims, 5 Drawing Sheets

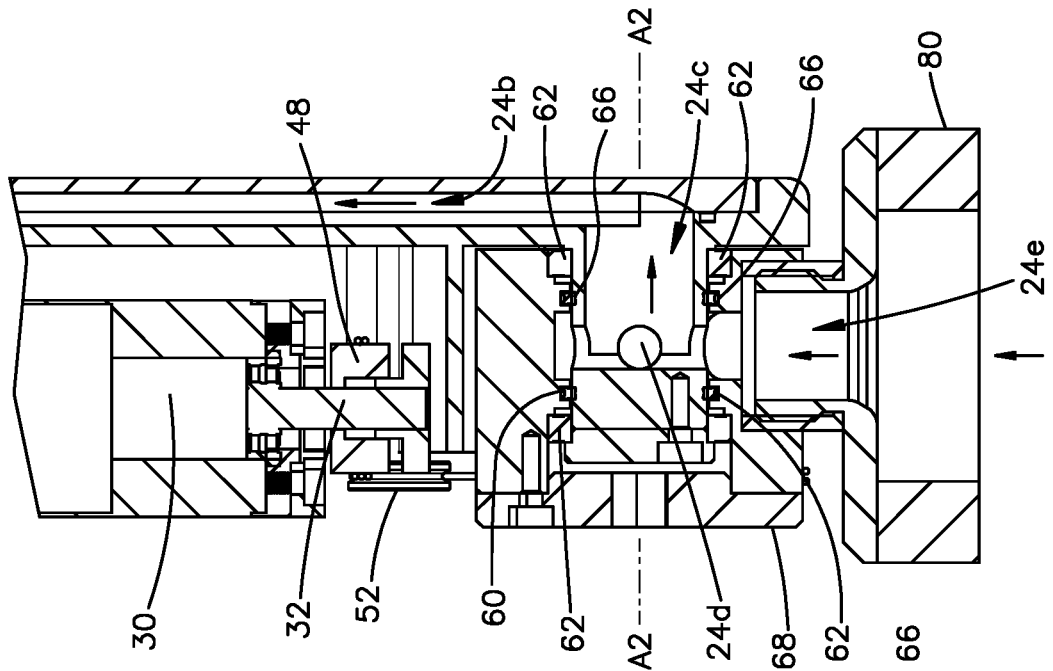
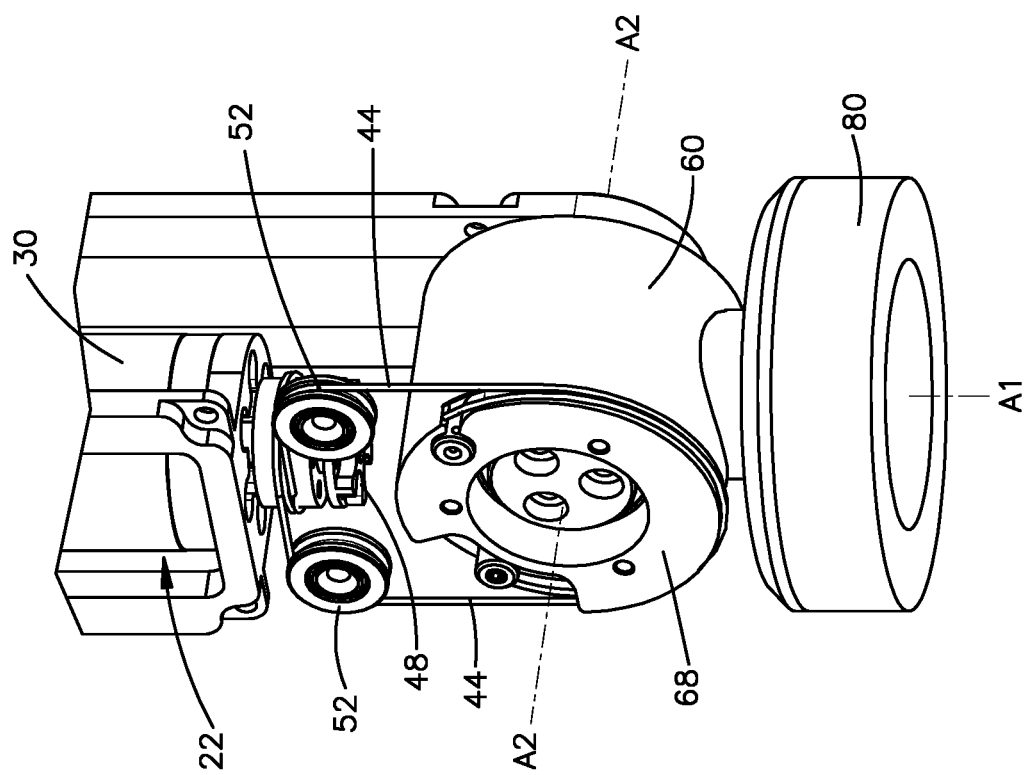

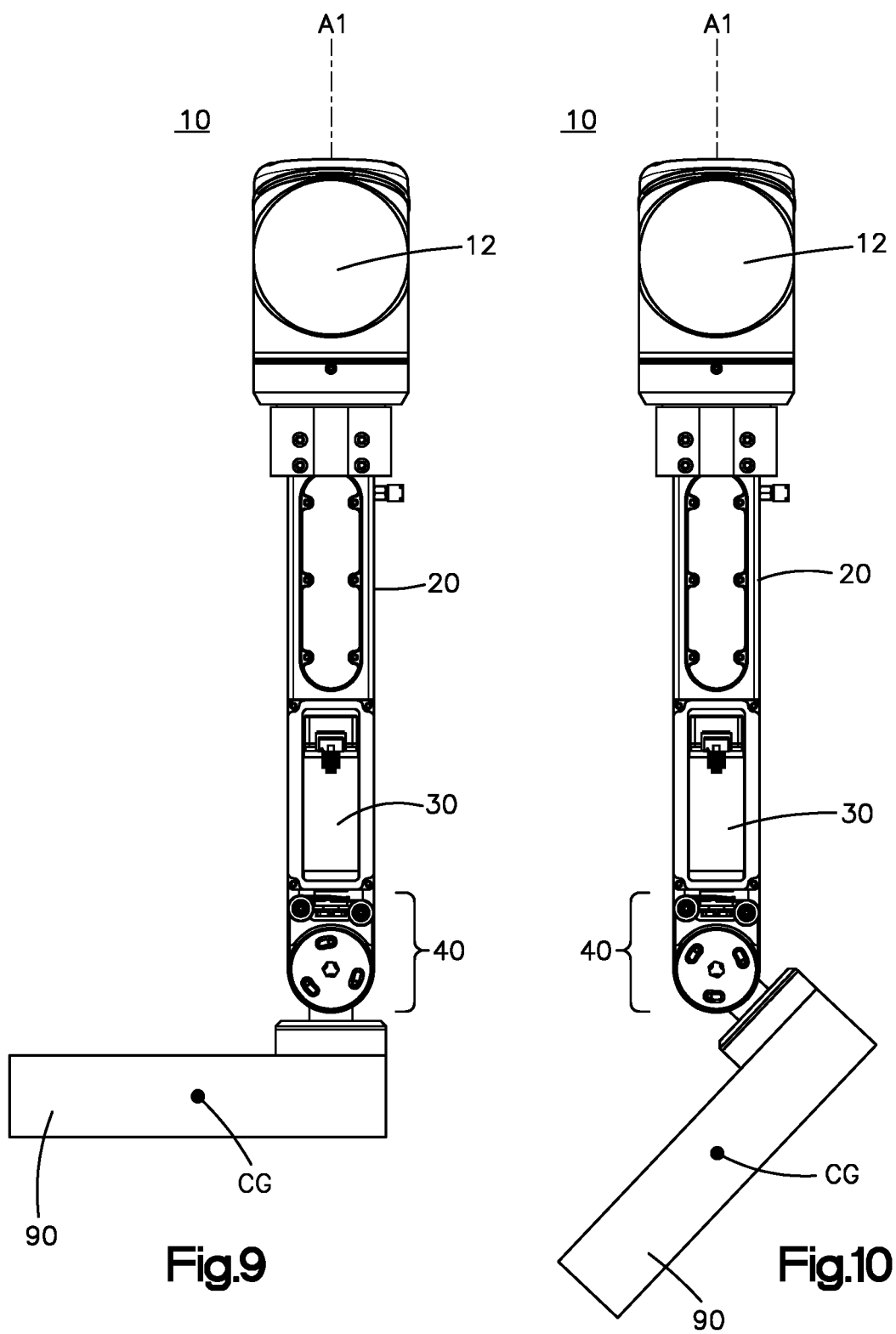

ARTICULATING SUCTION CUP TOOL

BACKGROUND

The present invention relates to automation, and more particularly to tools for engaging and lifting items via vacuum.

The robotics field has developed many tools for engaging and lifting items using end effectors. For example, end effectors sometimes employ suction cups for engaging a surface of an item and using a negative or suction pressure or vacuum to grasp the item.

Conventional suction cups on robotic end-of-arm tools have some limitations. For example, in a fulfillment center or like facility handling a great quantity of packages or objects per day, identifying and grasping using suction poses a significant challenge in robotic manipulation. In densely packed totes or like spaces it is often difficult to find horizontal surfaces of an item suitable for grasping. Hinged items, such as books, also pose a challenge for manipulation using suction due to the nature of the book binding acting as a hinge point. More generally, an item lifted by a suction cup might create a moment about the arm, or be subjected to another disturbance force. Mechanical intelligence, in general, addresses some drawbacks relating to control of mechanisms. The terms "mechanical intelligence" and "mechanically intelligent," as used herein, refer to the ability of a mechanism to respond or react to the environment without guidance of a controller. A simple example of a mechanically intelligent device is one-way plastic hinge that enables bending in one direction while preventing, via its structure, bending in another.

BRIEF DESCRIPTION OF THE DRAWINGS

FIG. 7 is another enlarged view of the drive and articulating head of FIG. 5, with portions of the housing removed for clarity;

FIG. 8 is an enlarged cross section view of a portion of the cross sectional view of FIG. 4;

FIG. 9 is a view of the tool of FIG. 1 grasping an item; and

FIG. 10 is a view of the tool of FIG. 9 with the articulating head pivoted to a neutral torque position, illustrating back-drive.

DETAILED DESCRIPTION OF ILLUSTRATIVE EMBODIMENTS

Figure 1:
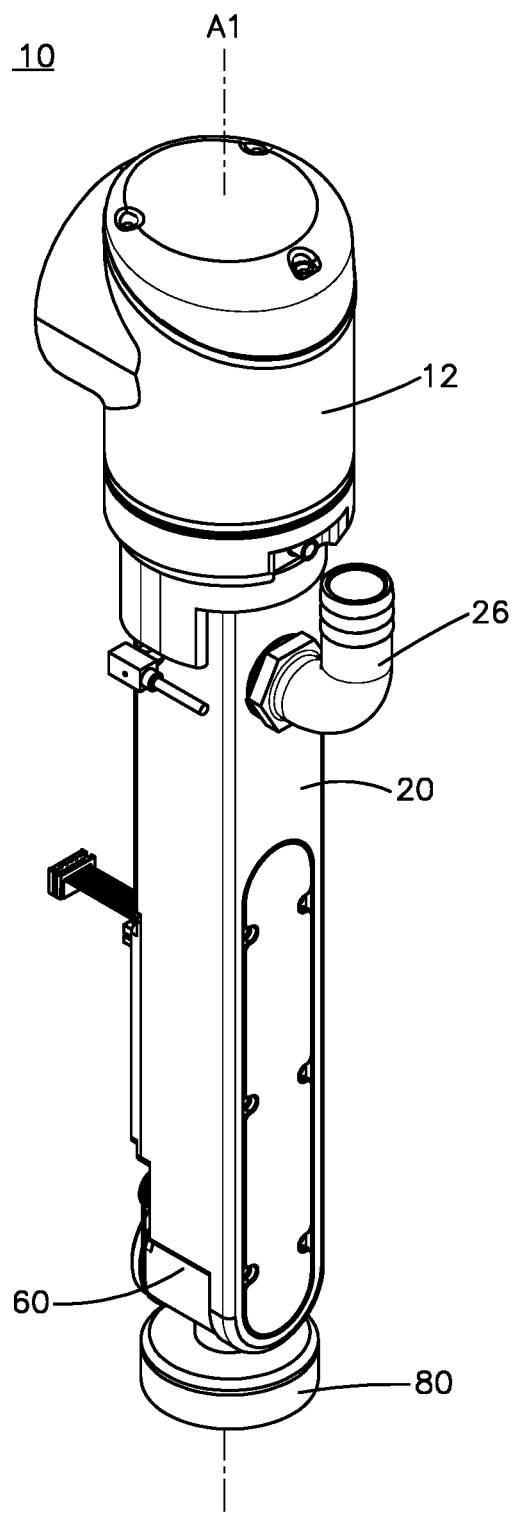
FIG. 1 is a top perspective view of an embodiment of an end-of-arm tool.
Figure 2:
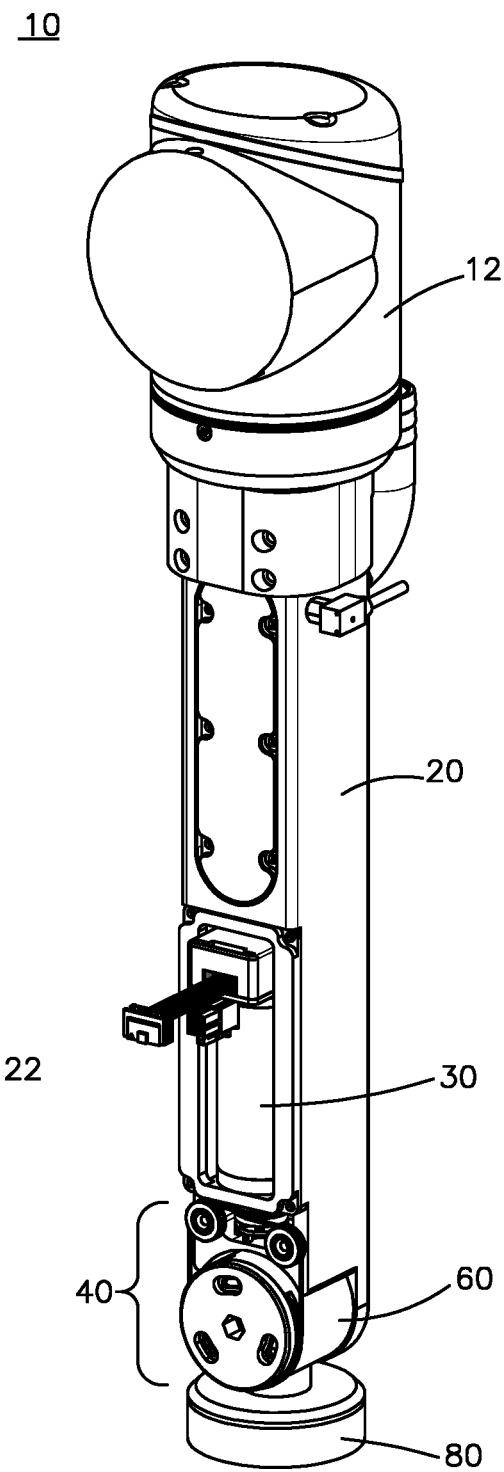
FIG. 2 is an opposite top perspective view of the tool of FIG. 1.
Figure 3:
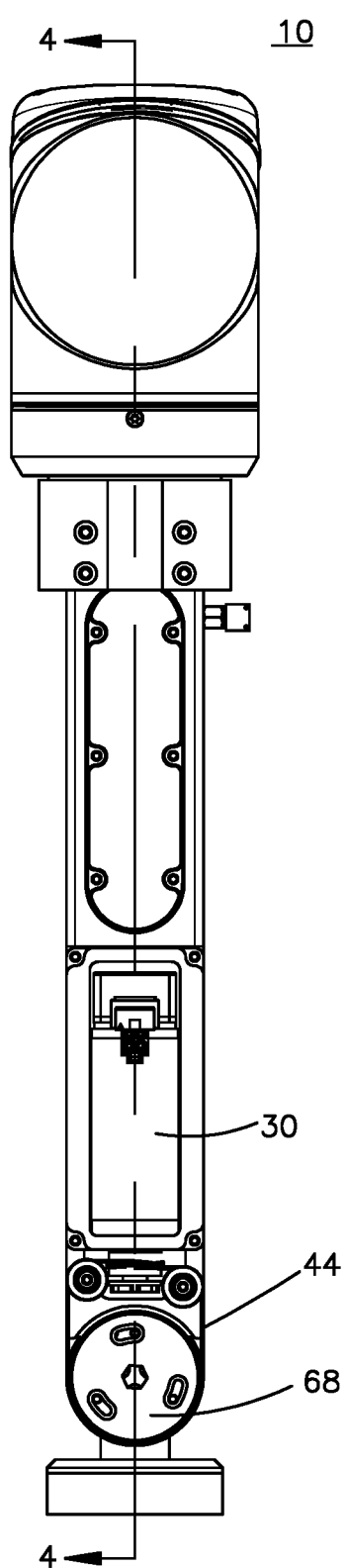
FIG. 3 is an elevation view of the tool of FIG. 1, illustrating drive and articulating head components.

A mechanically intelligent end-of-arm tool illustrated herein includes inventive aspects and features. For example, a back-drive-capable, articulating end-of-arm tool assembly for grasping items includes a body defining a longitudinal axis; a motor; an articulating head that is operatively coupled to the motor and that has an axis of rotation within 10 degrees of perpendicular to the longitudinal axis of the body, and a suction cup coupled to the articulating head and configured to grasp an item. The motor and articulating head are configured to be back-driven by a disturbance force applied to the suction cup. The axis may also be within 5 degrees of perpendicular or the axes may be perpendicular.

The mechanically intelligent, back-drive capability refers to the ability for the tool to apply near-zero or minimal resistance or damping to movement of the articulating head while the motor is not engaged in response to a disturbance force applied to the suction cup. The disturbance force can include at least one of a center of gravity of the item being out of alignment with the tool, bumping an object, deformation of the item, and acceleration or deceleration of the tool. The inertia and the friction of the motor and drive components in some configurations may offer near-zero resistance or dampening to the articulating head and/or suction cup moving in response to the disturbance force, such as when an item is picked. In this regard, the reflected inertia of the motor and the gear ratio may be chosen to produce the desired lack of resistance to motion when not powered (in other words, back-drivability). While the present application refers to a motor, other types of actuators, such as brakes, pistons, clutches, or springs may be used.

The tool assembly can also comprise: a tool body defining a longitudinal axis; a motor oriented longitudinally in the body; an articulating head including a pivot assembly having axis of rotation that is approximately perpendicular to the longitudinal axis of the body; a shaft about which the articulating head is pivotable, the shaft including a hollow channel configured to transmit air flow therethrough; and a suction cup coupled to the articulating head and open to the hollow shaft channel.

The tool can have a shaft about which the articulating head is pivotable, and the shaft can include a hollow channel configured to transmit air flow therethrough. The motor can be oriented longitudinally in the body, and the body can include a vacuum channel configured to transmit air flow from the suction cup to a proximal end of the body.

The drive assembly, which is configured to transmit torque output from the motor to the articulating head, can include a capstan pulley coupled to an output shaft of the motor, a driven pulley coupled to or integral with the articulating head, a pair of idler pulleys configured to engaged the cable between the capstan pulley and the driven pulley, a cable engaged with the capstan pulley and the driven pulley and configured to transmit motor torque from the capstan pulley to the articulating head, and a tensioner configured for adjusting cable tension. In this regard, the articulating head, according to the embodiment shown in the figures, refers to the driven pulley, to which the suction cup is attached, according to the embodiment shown in the figures. The present invention is not limited to the particular structure, such as the driven pulley or the presence of any pulley at all, unless expressly stated in the claims.

A method of grasping an item using the tool can comprise the steps of: a. moving an end-of-arm tool (such as by actuating the cable drive or other transmission elements) such that a suction cup attached to an articulating head engages an object; b. lifting the item via the suction cup after the moving step (b); and c. enabling back-drive of the articulating head in response to a disturbance force applied to the suction cup, such as during the lifting step (c). Preferably the axis of rotation of the head is within 10 degrees of perpendicular to the body longitudinal axis and the motor axis, or within 5 degrees or perpendicular. The method also encompasses allowing the cup to float and pressing the cup onto the object, causing actuation and alignment.

The method in some configurations enables the tool to retain grasp stability and in some circumstances is "floppy" such as when the motor does not apply a torque or a braking force. This is useful when pulling an object out from other objects or letting an object swing so that the suction doesn't pull off based on the inertia of the object. In an exemplary embodiment, the control system can determine when a torque or braking force should be applied and when the tool should remain floppy.

The term "end-of-arm" refers to the distal or working end of any kind of robot manipulator of any kind, including without limitation a robotic arm, a gantry, and any other configuration capable of positioning the suction cup tool. The term "cable" encompasses a flexible wire as illustrated in the figures, and also any rope, chain, ribbon, band and the like. Tensioning of the cable can be by any means.

Referring to the figures to illustrate an embodiment, an articulating, end-of-arm suction cup tool 10 includes a head 12, a body 20, a motor 30, a drive assembly 40, and a suction cup 80. Head 12 includes an interface for an arm that moves and manipulates the tool 10. The term "end-of-arm" refers to the distal or working end of any kind of robot or manipulator of any kind, including without limitation a robotic arm, a gantry, and any other configuration capable of positioning the suction cup tool.

Figure 4:
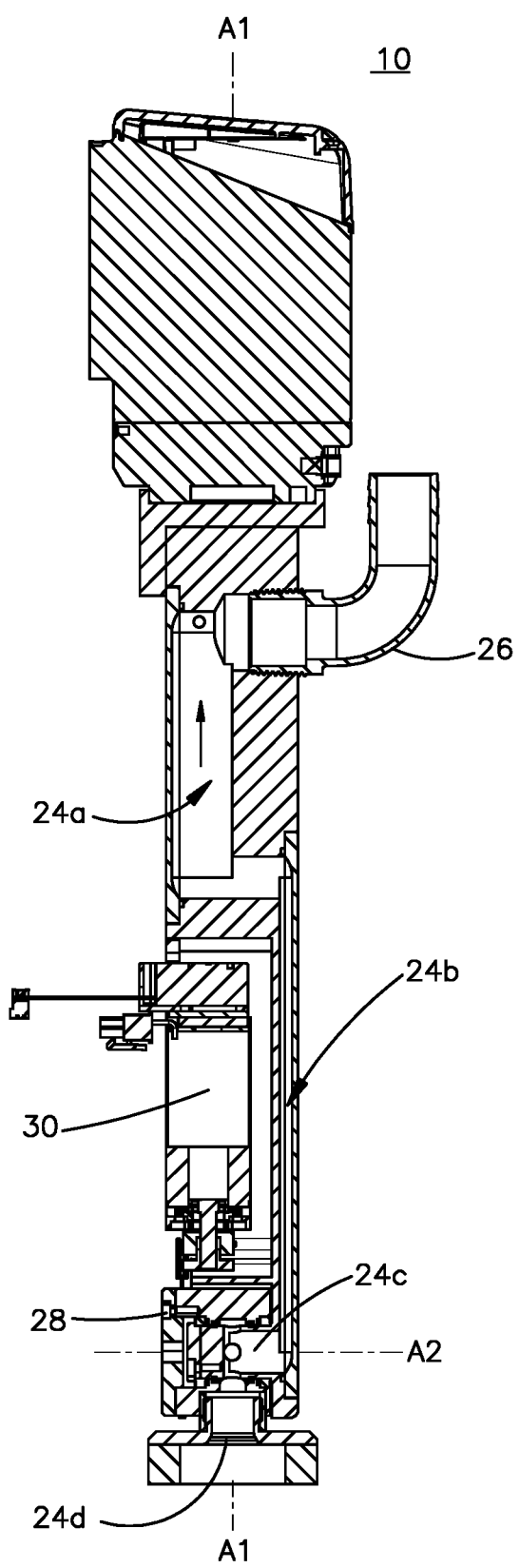
FIG. 4 is a cross sectional view taken through the plane 4-4 of FIG. 3.

Body 20 extends distally from head 12 and is formed by a housing that defines a longitudinal axis A1. Body 20 includes a recess 22 for housing motor 30 and a hollow shaft 28 distal to recess 22. Body 20 includes a vacuum channel through the length of body 20 that connects to a vacuum supply fitting 26 and to suction cup 80. As illustrated in FIGS. 4 and 8, an upper channel 24a extends from fitting 26 distally to motor recess 22, and turns to extend within body 20 and parallel to and beside motor recess 22. The vacuum channel turns and extends through shaft 28 to form shaft channel portion 24c. Shaft 28 includes apertures 24d, which open into a lower channel 242 that extends to the inboard portion of suction cup 80.

Thus, in operation, air flow is indicated by the arrows of FIGS. 4 and 8 through the channel portion 24e through portions 24d, 24c, 24b, and 24a to fitting 26. The term "air flow" is used broadly herein to refer to moving air and also to the transmission of pressure. For example, in circumstances in which the valve is in its actuated (open) position, the valve can permit air flow if the suction cup is spaced apart from the item to be grasped; and the term "air flow" is intended to apply even if the suction cup effectively blocks the movement of air, as the negative pressure of the plenum is transmitted to the suction cup and the item to be grasped.

Motor 30 in the embodiment of the figures is oriented parallel to body axis A1 and includes an output shaft 32 (FIG. 4). Motor 30 is coupled to a drive assembly 40 that includes a cable 44, capstan pulley 48, a pair of idler pulleys 52, a driven pulley 60, and a tensioner 68. Suction cup 80 is affixed to driven pulley 60.

Figure 5:
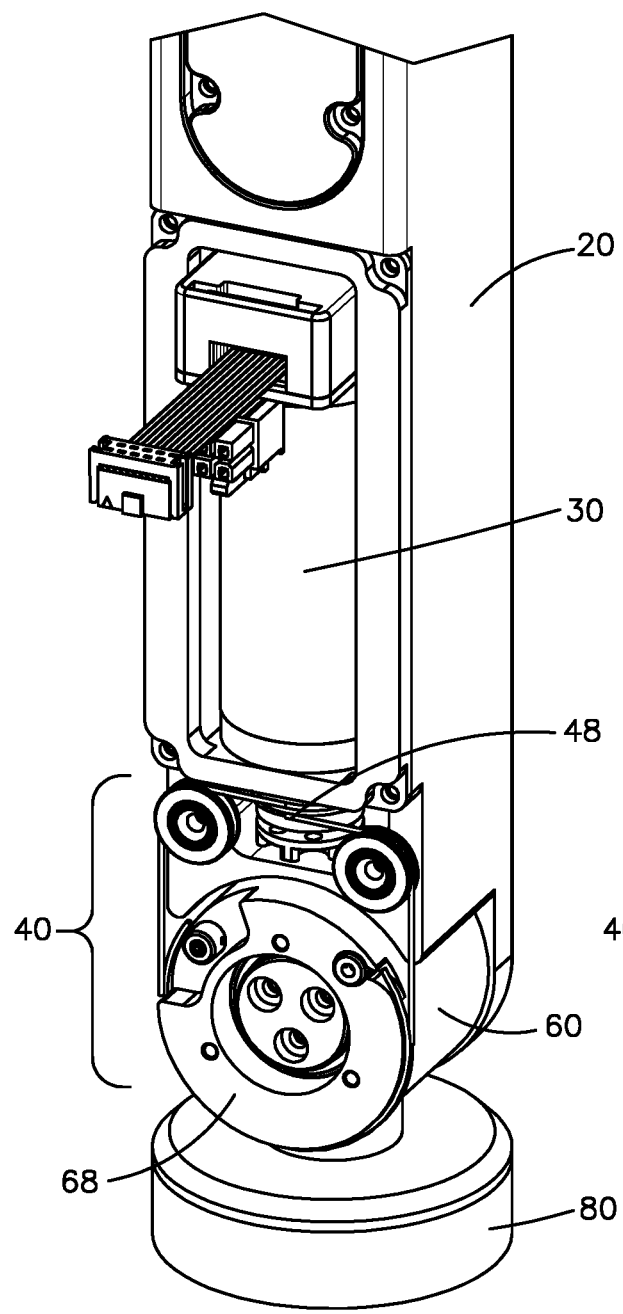
FIG. 5 is an enlarged perspective view of the drive and articulating head of the tool of FIG. 1.
Figure 6:
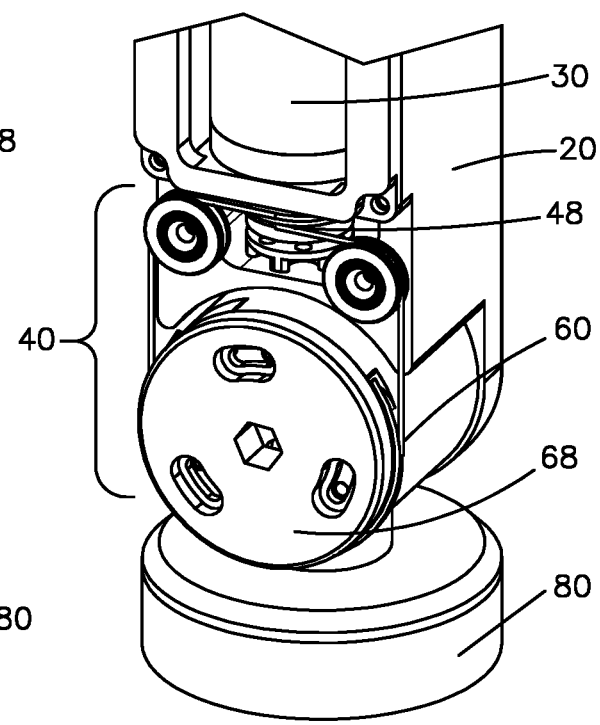
FIG. 6 is another enlarged perspective view of the drive and articulating head of FIG. 5, from a different angle.

Cable 44 wraps around capstan pulley 48 and extends laterally from the front of capstan pulley 48, Capstan pulley 48 is coupled to motor output shaft 32 and thus is vertically oriented (that is, its axis of rotation is vertical when body axis A1 is vertical). Cable 44 extends laterally from capstan pulley 48 on each side to engage the idler pulleys 52, which are horizontally oriented such that the orientation of cable 44 yields from horizontal to vertical, as shown for example in FIGS. 5-7. Cable 44 extends from idler pulleys 52 to wrap around driven pulley 60. Cable 44 may circle capstan pulley 48 and driven pulley 60 as many times as desired according to the chosen cable tension, bearing loading and life, and other engineering parameters.

A tensioner 68 is mounted to driven pulley 60. Tensioner 68 controls the tension of cable 44, and in the embodiment of the figures, an end of cable 44 is affixed to driven pulley 60 and another end is affixed to tensioner 68. Any type of tensioning mechanism may be employed, such as, without limitation, locking that applies tension to the cable by, locking screws that apply the clamp forces. In the embodiment shown in the figures, tensioner 68 is a tensioning locking element.

Driven pulley 60 pivots on pulley shaft 28, which is fixed inside body 20, on a pair of bearings 62 (FIG. 8). Shaft 28 is oriented horizontally (that is, perpendicular to body axis A1 when axis A1 is vertical) to form articulating axis A2. Axes A1 and A2 in the figures are perpendicular—that is, perpendicular or with a minor deviation from perpendicular based on design considerations for the particular application. In other words, perfect perpendicularity is not required. Seals 66 are also on the outboard surface of pulley shaft 28 to isolate flow path 24 from ambient.

To articulate driven pulley 60 and suction cup 80, the arm can position tool 10 while moving suction cup 80 into a desired orientation. In this regard, motor 30 can rotate capstan pulley 48 in the direction corresponding to the desired direction of pivoting of suction cup 80. Rotation of capstan pulley 48 pulls cable 44 to move driven pulley 60, and therefore to move suction cup 80.

Referring to FIG. 9, an item 90 has been engaged and lifted by suction cup 80. Item 90 has a center of gravity CG that is laterally offset from axis A1 and thus imparts a moment on drive 40. In some circumstances, such as upon encountering a disturbance force, it is an advantage for drive 40 to have a back-drive capability. FIG. 9 illustrates drive 40 as one example of a disturbance force applied to suction cup 80, in which the motor is not braked and the system coasts to a stable position in which no moment is imparted from item 90 and no torque is applied by the motor or drive. The disturbance force that would tend to pivot articulating pulley 60 and suction cup 80 can include bumping object 90 against other objects or the side of a tote or any other structure; deformation of the object 90, such as when object 90 itself deforms or a layer or package or file over object 90 deformed; and acceleration or deceleration of the tool 10. For merely one example, object 90 may be located below another object, and thus tool 10 can back-drive while object 90 is lifted and the other object is displaced. In some circumstances, item 90 may be a packaged book such that the binding of the book acts as a hinge and the un-grasped cover and pages pivot about the binding.

Optionally, feedback from the motor could be obtained through the motor torque or motor shaft rotation to enable the control system to control the movement.

In addition to the mechanically intelligent movement of the articulating head, the position and orientation of the end effector may be controlled through instructions from the control system. In this way, the control system is layered on top of the natural physics of the end effector. Specifically, the control system may receive input from a human operator and/or a grasp planning program so as to employ custom grasping strategies for various types sizes and shapes of items. For example, in relation to suction-type end effectors, six-sided boxes with planar surfaces and no label may require only simple grasping strategies regardless of size and orientation. But items with more complex surfaces may be difficult to grasp, especially if these items are disposed in close proximity to other items and objects, such as when multiple items are disposed in a storage container such as a gaylord, a tote, a pile of objects, and the like.

In some embodiments, the control system may receive data from one or more sensors (for example, optical, contact, proximity, etc.) disposed on and/or around the end effector. This data will be used by the control system to determine surface shapes, stiffnesses and/or other descriptive parameters of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two-dimensional image of the item showing a feature may allow an identification of a respective surface. If the two-dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

The control system may receive input—from a human, from one or more sensors, and/or from algorithms employing sensor data or other heuristics—regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save data to the database data related to the successful strategy for future use by the specific end effector and other end effectors grasping the same or similarly shaped items.

The mechanical intelligence of the back-drivability and compliance in this regard can change the constraint space in which the machine can operate on sensor and other data to yield a better result, and faster or more effective picking or moving or orienting of the items. In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms, other sensors, and/or control systems.

The end-of-arm tool structure and function are described herein by referring to advantages and specific examples or embodiments. The present invention is not limited to the advantages explained herein, nor to the structure or function of the examples or embodiments. For merely one example, the articulating head illustrated in the figures has one degree of freedom, and the present invention is not limited to one degree of freedom. Rather, it is intended that the structure and function described herein be applicable to tools having additional degrees of freedom, as will be understood by persons familiar with articulating end of arm tools and the invention should be given the full scope of the plain meaning of the claims.

What is claimed:

1. A mechanically intelligent, back-drive-capable, articulating end-of-arm tool assembly for grasping an item, the end-of-arm tool assembly comprising:
    a body defining a longitudinal axis;
    a motor;
    an articulating head that is operatively coupled to the motor and that has an axis of rotation within 10 degrees of perpendicular to the longitudinal axis of the body; and
    a suction cup coupled to the articulating head and configured to grasp an item;
    whereby the motor and articulating head are adapted to be back-driven by a disturbance force applied to the suction cup, wherein the motor is oriented longitudinally in the body, and wherein the body includes a vacuum channel configured to transmit air flow from the suction cup through the body.

2. The end-of-arm tool assembly of claim 1 wherein the disturbance force includes at least one of a center of gravity of the item being out of alignment with the end-of-arm tool assembly, bumping an object, deformation of the item, and acceleration or deceleration of the end-of-arm tool assembly.

3. The end-of-arm tool assembly of claim 1 further comprising a shaft about which the articulating head is pivotable, the shaft including a hollow channel configured to transmit air flow therethrough.

4. The end-of-arm tool assembly of claim 1 further comprising a drive assembly configured to transmit torque output from the motor to the articulating head.

5. The end-of-arm tool assembly of claim 4 wherein the drive assembly includes a capstan pulley coupled to an output shaft of the motor, a driven pulley coupled to or integral with the articulating head, and a cable engaged with the capstan pulley and the driven pulley and configured to transmit motor torque from the capstan pulley to the articulating head.

6. The end-of-arm tool assembly of claim 5 wherein the drive assembly includes a pair of idler pulleys configured to engage the cable between the capstan pulley and the driven pulley.

7. The end-of-arm tool assembly of claim 5 wherein the drive assembly includes a tensioner configured for adjusting cable tension.

8. The end-of-arm tool assembly of claim 1 wherein the axis of rotation is within five degrees of perpendicular to the longitudinal axis of the body.

9. The end-of-arm tool assembly of claim 1 wherein the axis of rotation is perpendicular to the longitudinal axis of the body.

10. An articulating end-of-arm tool assembly comprising:
an end-of-arm tool body defining a longitudinal axis;
an actuator oriented longitudinally in the body;
a shaft about which an articulating head is pivotable, the shaft including a hollow channel configured to transmit air flow therethrough; and
a suction cup coupled to the articulating head and open to the hollow channel;
whereby the actuator and articulating head are configured to be back-driven by a disturbance force applied to the suction cup.

11. The end-of-arm tool assembly of claim 10 further comprising a drive assembly configured to transmit torque output from a motor to the articulating head, the drive assembly including a capstan pulley coupled to an output shaft of the motor, a driven pulley coupled to or integral with the articulating head, a pair of idler pulleys between the capstan pulley and the driven pulley, and a cable engaged with the capstan pulley and the driven pulley and configured to transmit motor torque from the capstan pulley to the articulating head.

12. The end-of-arm tool assembly of claim 11 wherein the drive assembly includes a tensioner configured for adjusting cable tension.

13. The end-of-arm tool assembly of claim 12 wherein a first end of the cable is affixed to the tensioner and a second end of the cable is affixed to the driven pulley.

14. The end-of-arm tool assembly of claim 10 wherein the disturbance force includes at least one of a center of gravity of an item lifted by the suction cup being out of alignment with the end-of-arm tool assembly, bumping an object, deformation of the item, and acceleration or deceleration of the end-of-arm tool assembly.

15. A method of grasping an item, comprising the steps of:
a. moving the end-of-arm tool assembly of claim 10 such that a suction cup attached to an articulating head engages an item, and pivoting the articulating head on an axis within 10 degrees of perpendicular to a longitudinal axis of the end-of-arm tool assembly;
b. lifting the item via the suction cup after the moving step (a); and
c. enabling back-drive of the articulating head in response to a disturbance force applied to the suction cup during at least one of the moving step (a) and the lifting step (b).

16. The method of claim 15 wherein the moving step (a) includes applying a motor torque to a drive of the end-of-arm tool assembly to pivot the articulate the head.

17. The method of claim 15 wherein the lifting step (b) including drawing vacuum through the suction cup and through shaft on which the articulating head pivots.

18. The method of claim 15 wherein the disturbance force includes at least one of a center of gravity of an item lifted by the suction cup being out of alignment with the end-of-arm tool assembly, bumping an object, deformation of the item, and acceleration or deceleration of the end-of-arm tool assembly.

* * * * *